May 31, 1927.
R. M. FERRELL
1,630,735
HIGH PRESSURE LUBRICATOR
Filed March 3, 1926
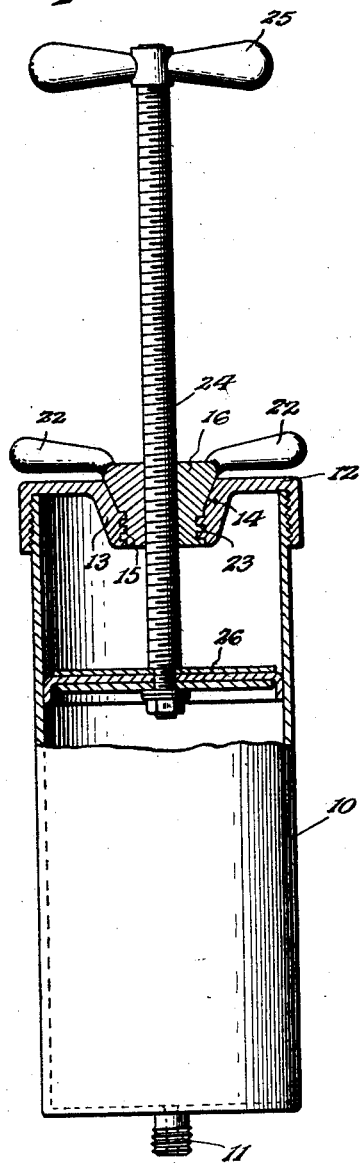
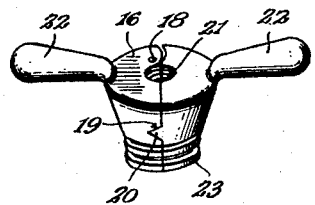
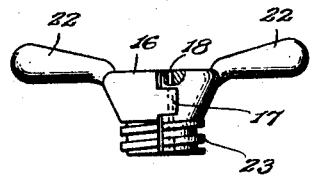
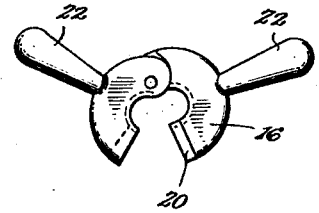
Inventor
Robert M. Ferrell.
By Lacy & Lacy, Attorneys Patented May 31, 1927.

1,630,735

UNITED STATES PATENT OFFICE.

ROBERT M. FERRELL, OF IRVINE, CALIFORNIA.

HIGH-PRESSURE LUBRICATOR.

Application filed March 3, 1926. Serial No. 92,039.

This invention relates to an improved high pressure lubricator particularly designed for use in filling the lubricant cups or channels of motor vehicles or the like and seeks, among other objects, to provide a device wherein the plunger employed may be easily and quickly retracted and the necessity of tediously counter-rotating the plunger thereby eliminated.

The invention seeks as a further object, to provide a device embodying a bearing nut which mounts the plunger, and wherein said nut may be removed for freeing the plunger for retraction.

Another object of the invention is to provide a device wherein the bearing nut may be easily and quickly attached to or detached from the container employed, and wherein the nut may be adjusted for contracting or compressing the nut about the plunger rod to effectively coact with the thread thereof.

And the invention seeks, as a still further object, to provide a plunger mounting which, while being eminently adapted for use in connection with pressure lubricators, will also be well suited for use in various other situations.

Other objects of the invention not specifically mentioned in the foregoing, will appear during the course of the following description.

In the accompanying drawings:

Figure 1 is a view partly in elevation and partly in section, and showing a high pressure lubricator embodying the present invention.

Figure 2 is a perspective view of the bearing nut which mounts the plunger.

Figure 3 is a rear elevation of the nut.

Figure 4 is a plan view showing the sections of the nut partly swung open.

In carrying the invention into effect, I employ a preferably cylindrical container 10 at the lower end of which is an outlet nipple 11 or other suitable device for detachably connecting the container with any one of the various lubricant receiving fittings of a motor vehicle or the like. Closing the container at its upper end is a head or cap 12 which, in the present instance, is shown as being screwed over the container so that said head may be removed for filling the container, and formed on the head is an inwardly directed annular flange 13 providing a socket 14 axially of the container. The upper portion of the socket is of conical shape while the lower portion of the socket is cylindrical and is provided with a preferably square thread 15.

Removably secured in the socket 14 of the head 12 of the container is a bearing nut 16 which, as particularly brought out in Figures 2, 3 and 4 of the drawings, is composed of a pair of complemental sections. At the rear side of the nut, one of said sections is, as brought out in Figure 3, provided with a projecting hinge lug 17 which freely fits in a notch in the other of said sections, and extending through the latter section and through said lug is a pivot pin 18 swingingly connecting the sections. Formed in one of the sections at the forward side of the nut is a V-shaped notch 19 and formed on the other of said sections is a projecting V-shaped lug 20 fitting in said notch when the sections are closed for maintaining the sections in registration. The nut is further provided with an axial screw threaded bore 21 and projecting from the sections of the nut, at the upper end of the same, are alined wings or handles 22. The lower end of the nut is cylindrical, being shaped to fit in the cylindrical lower end portion of the socket 14 of the head 12 of the container, and is provided with a square thread 23 to mate with the thread 15 of the socket, while the upper end portion of the nut is of conical shape to fit in the conical upper end portion of said socket.

Supported by the nut 16 is a plunger embodying a plunger rod 24, to the outer end of which is appropriately fixed a handle 25, and secured on the inner end of said rod is a head 26 slidably fitting in the container 10. The plunger rod is accommodated through the bore 21 of the nut and is provided throughout its length with a screw thread mating with the screw thread of said bore.

As will now be seen upon reference to Figure 1, the handle 25 of the plunger may, after the container has been filled, be manually turned for rotating the plunger rod 24 and advancing the plunger downwardly within the container for expelling the lubricant therefrom. To retract the plunger, the nut 16 is turned in the socket 14 of the head 12 until the thread 23 of the nut becomes disengaged from the thread 15 of said socket, when the plunger will be freed for rearward movement. Thus, the plunger may be easily and quickly retracted, and preferably, the sections of the nut are, after the nut is disengaged from the head 12, swung open and the nut removed from the plunger rod so that the nut may not hamper the retraction of the rod. After the container has been again filled, the nut is then assembled about the forward end portion of the plunger rod and screwed into the socket 14 of the head 12 for connecting the plunger with the head, and attention is now directed to the fact that the upper smooth portion of the socket 14 is of such size that, as the nut is screwed home, the socket will coact with the smooth upper portion of the nut for compressing the sections of the nut together and advancing the thread of the bore 21 of the nut into the thread groove of the plunger rod 24. The thread of said bore will thus be caused to effectively coact with the thread of the rod so that mutilation of the threads, such as would be caused by looseness of the rod, will be effectually prevented.

Having thus described the invention, what I claim is:

1. The combination with a threaded plunger rod, of a socket having a relatively coarse threaded bore, and a sectional nut engaged about the rod and in the socket, the sections of the nut being hinged together at one side and provided at the opposite side on their meeting faces intermediate their ends with an interengaging tapered lug and notch whereby the sections will be caused to register as they are closed about the rod.

2. In a pressure lubricator, a container having a head, said head being provided with a socket having a conical portion and a cylindrical portion provided with a square thread, a plunger within the container, a plunger rod extending axially from the plunger through the container head, and a sectional nut removably assembled about the plunger rod for quick adjustment therealong and having a conical portion to fit in the conical portion of the socket and a cylindrical portion to fit in the cylindrical portion of the socket and provided with a square thread engaging the square thread of the socket for connecting the nut with the head, the nut being adjustable in said socket and the conical portion of the socket being formed to coact with the conical portion of the nut for contracting the nut about the plunger rod as the nut is adjusted, and a screw threaded connection between the nut and plunger rod whereby the rod may be rotated for advancing the plunger, the nut being freely detachable from the head for freeing the plunger for retraction.

In testimony whereof I affix my signature.

ROBERT M. FERRELL. [L. S.]